United States Patent Office 3,176,010
Patented Mar. 30, 1965

3,176,010
6-METHYL-3-OXO-4,7-DIENIC STEROIDS
George Cooley, Bernard Ellis, and Vladimir Petrow, London, England, assignors to The British Drug Houses Limited
No Drawing. Filed Mar. 19, 1963, Ser. No. 266,198
Claims priority, application Great Britain, Mar. 22, 1962, 11,106/62
8 Claims. (Cl. 260—397.4)

This invention is for improvements in or relating to organic compounds and has particular reference to 6-methyl-3-oxo-4,7-dienic steroids of the androstane and pregnane series, which group of compounds has hitherto not been known in the art.

It is an object of the present invention to provide novel 6-methyl-3-oxo-4,7-dienic steroids of the androstane and pregnane series, including the general Formula I below which compounds are of value on account of their biological properties such for example, as anabolic, androgenic, ovulation inhibiting, claudogenic properties or as intermediates in the preparation of compounds with useful biological, hormonal or antihormonal properties.

The present invention provides the following specific novel steroidal compounds:

17α - acetoxy - 6 - methylpregna - 4,7 - diene - 3,20-dione and 17α - acetoxy - 6,16α - dimethylpregna - 4,7-diene-3,20-dione, which are of value on account of their hormonal properties. Thus, for example, the compounds have a favourable ovulation inhibiting/progestational index which renders them of value in, for example, the control of fertility in domestic animals.

6-methylandrosta-4,7-diene-3,17-dione, which is of value on account of its anabolic/androgenic properties and as an intermediate for the preparation of hormonally active compounds. Thus, for example, by prior art methods used for the conversion of 6-methylandrost-4-ene-3,17-dione into the corresponding 6α-methyltestosterone, it may be converted into the corresponding 6-methyl-7-dehydrotestosterone which is of value on account of its anabolic/androgenic index.

17α - acetoxy - 21 - fluoro - 6 - methylpregna - 4,7-diene - 3,20-dione, 17α,21-diacetoxy-6-methylpregna-4,7-diene-3,20-dione and 16α,17α-diacetoxy-6-methylpregna-4,7-diene-3,20-dione possess antifertility properties.

17β - acetoxy - 6,17α - dimethylandrosta - 4,7 - dien - 3-one and 17β-acetoxy-17α-ethynyl-6-methylandrosta-4,7-dien-3-one possess anabolic/androgenic properties.

According to the present invention there is provided a process for the preparation of 6-methyl-3-oxo-4,7-dienic steroids of the androstane and pregnane series, including the general formula

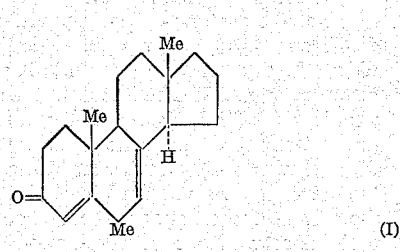

which process comprises treating a 6-methyl-3,5,7-trienic-3-enol ether including the general formula

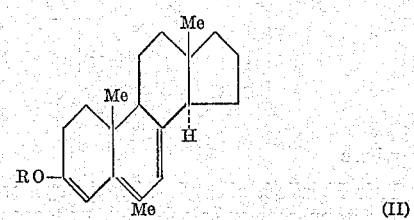

where R is an alkyl or alicyclic radical containing not more than 7 carbon atoms with an acidic reagent which will regenerate the 3-oxo- function. The acidic reagent for example, may comprise acetic acid, oxalic acid, or hydrochloric acid.

In carrying the process of the invention into effect, the 6-methyl-3,5,7-trienic-3-enol ether of Formula II may be converted into the 6-methyl-3-oxo-4,7-diene of Formula I by treating it with, for example, aqueous acetic acid, under appropriate experimental conditions. When aqueous acetic acid is used, the enol ether (II) may be dissolved in a convenient volume of acetic acid at a temperature which may be in the region of 100° C., and the solution diluted with water, added portion wise over a period of 20–30 minutes, in sufficient quantity to cause separation of the crude 6-methyl-3-oxo-4,7-dienic product (I). The temperature may be maintained in the region of 100° C. throughout this operation. Thereafter the product may be collected by filtration, and purified by techniques well-known to those skilled in the art. In some cases, the steroidal product fails to separate from the reaction mixture in the solid or crystalline state. A large excess of water may then be added to the reaction mixture, and the product isolated by extraction with a suitable organic solvent and subsequently purified.

The process of the invention may be applied to derivatives of the androstane series including the general Formula II and which may be additionally substituted by hydroxyl or acyloxy groups, for example at position $C_{16}$ and/or $C_{17}$, by lower alkyl, alkenyl, alkynyl groups or halo derivatives thereof, for example at position $C_{17}$ and by oxo-groups, or functional derivatives thereof, for example at $C_{17}$.

The process of the invention may also be applied to derivatives of the pregnane series including the general Formula II and which may be additionally substituted by hydroxyl or acyloxy groups, for example at $C_{16}$, $C_{17}$ and $C_{21}$, by lower alkyl groups, for example at $C_{16}$ and $C_{17}$ and by oxo-groups, or functional derivatives thereof, at $C_{20}$, or by halo derivatives, for example at $C_{21}$.

The process of the invention is particularly applicable to the preparation of derivatives of the androstane and pregnane series represented by the following general formulae and the acyl derivatives thereof:

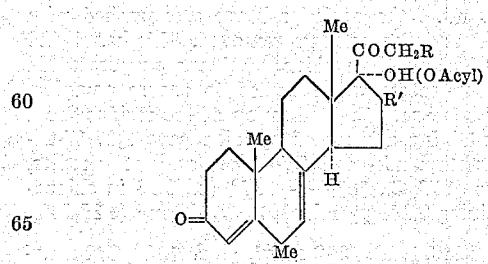

where

R is H, Cl, F, Br, OH (OAcyl)

R' is H, Me, F, OH (OAcyl)

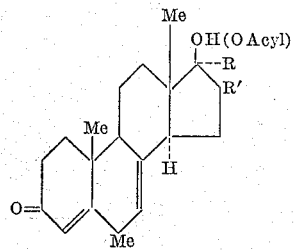

where

R is H, alkyl, alkenyl, alkynyl, aryl or alkaryl, up to 8 carbon atoms; haloalkynyl, trifluoromethylalkynyl, dialkynyl R' is H or Me

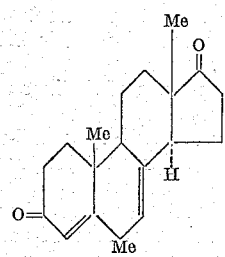

Such acyl derivatives may be derived from hydrocarbon carboxylic acids containing from 1 to 12 carbon atoms inclusive, for example a saturated straight chain aliphatic acid such as acetic, propionic, butyric, valeric, hexanoic; lauric; a saturated branched-chain aliphatic acid, e.g. trimethylacetic, isobutyric, isovaleric, a cycloaliphatic saturated acid, e.g. cyclohexane carboxylic acid, $\beta$-cyclopentanepropionic acid; an alkaryl acid, e.g. phenyl acetic, 2-phenylpropionic, o-, m- and p-toluic; a saturated dibasic acid (which may be converted into water soluble, e.g. sodium salts), e.g. succinic, adipic; a mono basic unsaturated acid, e.g. acrylic, crotonic, undecylenic, propiolic, cinnamic; a dibasic unsaturated acid (which can be converted into water soluble e.g. sodium salts), e.g. maleic and citraconic.

The initial materials employed in the process of the present invention may be prepared according to a process described in our copending application No. 227,706, filed on October 2, 1962, now U.S. Patent No. 3,153,060, in which the appropriate 3-oxo-6-methyl-4,6-dienic derivative is submitted to enol etherification by reaction with an aliphatic or alicyclic alcohol (containing up to 7 carbon atoms) or with an orthoformate ester thereof in the presence of a catalytic quantity of H+ ions.

The initial material employed in Example 2 of the present invention was prepared in the following way:

6-methylandrosta-4,6-diene-3,17-dione (Ellis, Kirk, Petrow, Waterhouse and Williamson, J. Chem. Soc., 1960, 2828) (6 g.) in dry benzene (100 ml.) was treated with methyl orthoformate (4 ml.) methanol (4 ml.) and toluene-p-sulphonic acid (200 mg.), and the mixture heated under reflux for 2 hours. After the addition of pyridine (4 ml.), the cooled mixture was washed with water, dried and the solvents removed. Methanol (20 ml.) was added to the residue, and then evaporated in vacuo. This process was repeated to ensure complete removal of benzene. Crystallisation of the residue from acetone containing a trace of pyridine gave 3,17,17-trimethoxy-6-methylandrosta-3,5,7-triene as flat needles, M.P. 182 to 187° C., $[\alpha]_D^{23}$ —138° (c., 0.93 in chloroform containing 0.2% pyridine), $\lambda_{max.}$ 320 m$\mu$ ($\epsilon$ 19,500)

$\gamma_{max.}^{CCl_4}$ 2946, 1649, 1620, 1392 cm.$^{-1}$, $\gamma_{max.}^{CS_2}$ 1134, 832 cm.$^{-1}$ The initial material employed in Example 4 was prepared as follows:

17$\alpha$ - acetoxy - 21 - fluoro - 6 - methylpregna - 4,6-diene-3,20-dione (Sollman, Elton and Dodson, J. Amer. Chem. Soc., 1959, 81, 4435) (3 g.) in dry benzene (50 ml.) was treated with triethylorthoformate (2 ml.) ethanol (2 ml.) and toluene-p-sulphonic acid (100 mg.) and the mixture heated under reflux for 3½ hours. Pyridine (1 ml.) was added to the cooled mixture, which was then washed and dried. After removal of the solvents in vacuo, the residue was purified from ethanol containing a trace of pyridine to give 17$\alpha$-acetoxy-3-ethoxy-21-fluoro-6-methylpregna-3,5,7-trien-20-one, needles, $\lambda_{max.}$ 321 m$\mu$ ($\epsilon$ 19,000), $\gamma_{max.}^{CCl_4}$ 1736, 1718, 1648 and 1616 cm.$^{-1}$ The initial material employed in Example 5 was prepared as follows:

17$\alpha$,21 - diacetoxy - 6 - methylpregna-4,6-diene-3,20-dione (Ruggieri, Ferrani and Gandolfi, Annali di Chimica, 1959, 49, 1371) (2 g.) in dry benzene (35 ml.) was treated with methyl orthoformate (1.5 ml.), methanol (1.5 ml.) and toluene-p-sulphonic acid (75 mg.), and the mixture heated under reflux for 2½ hours. After the addition of pyridine (2 ml.), the cooled mixture was washed, dried, and the solvents removed. Crystallisation of the residue from aqueous acetone containing a trace of pyridine gave 17$\alpha$,21-diacetoxy-3-methoxy-6-methylpregna-3,5,7-trien-20-one, needles, $\lambda_{max.}$ 322 m$\mu$ ($\epsilon$, 19,500), $\gamma_{max.}^{CCl_4}$ 1738, 1720, 1647 and 1617 cm.$^{-1}$ The initial material employed in Example 6 was prepared as follows:

A solution of 6,17$\alpha$-dimethyl-17$\beta$-hydroxyandrosta-4,6-dien-3-one (Ellis, Kirk, Petrow, Waterhouse and Williamson, J. Chem. Soc., 1960, 2828) (5 g.) in acetic anhydride (20 ml.) and pyridine (20 ml.) was heated for 4 hours under reflux. The mixture was poured into water, and the product purified by crysallisation to give 17$\beta$-acetoxy-6,17$\alpha$-dimethylandrosta-4,6-dien-3-one, $\lambda_{max.}$ 290 m$\mu$ ($\epsilon$, 23,500). This compound (3 g.) in dry benzene (60 ml.) was treated with methyl orthoformate (2.5 ml.), ethanol (2.5 ml.) and toluene-p-sulphonic acid (130 mg.), and the mixture refluxed for 2 hours. After addition of pyridine (2 ml.), the cooled mixture was washed, dried, and the solvents removed in vacuo. The residue was purified from aqueous methanol containing a trace of pyridine to give 17$\beta$-acetoxy-6,17$\alpha$-dimethyl-3-methoxyandrosta-3,5,7-triene $\lambda_{max.}$ 320 m$\mu$ ($\epsilon$, 19,450), $\gamma_{max.}^{CCl_4}$ 1730, 1648 and 1610 cm.$^{-1}$ The initial material employed in Example 7 was prepared as follows:

17$\alpha$-ethynyl - 17$\beta$ - hydroxy-6-methylandrosta-4,6-dien-3-one (Ellis, Kirk, Petrow, Waterhouse and Williamson, J. Chem. Soc., 1960, 2828) (4.5 g.) in acetic anhydride (20 ml.) and pyridine (20 ml.) was heated under reflux for 3½ hours. The product obtained on pouring the mixture into water was purified from aqueous ethanol to give 17$\beta$-acetoxy - 17$\alpha$ - ethynyl-6-methylandrosta-4,6-dien-3-one, $\lambda_{max.}$ 289 m$\mu$ ($\epsilon$, 22,600). This compound (3 g.) in dry benzene (50 ml.) was treated with ethyl orthoformate (2 ml.) ethanol (2 ml.) and toluene-p-sulphonic acid (100 mg.) and the mixture heated under reflux for four hours. The mixture was cooled, pyridine (1 ml.) was added, and after being washed and dried, the solvents were removed in vacuo. Crystallisation of the residue from aqueous ethanol containing a trace of pyridine gave 17$\beta$-acetoxy-3-ethoxy-17$\alpha$-ethynyl-6-methylandrosta-3,5,7-triene, $\lambda_{max.}$ 321 m$\mu$ ($\epsilon$, 19,050), $\gamma_{max.}^{CCl_4}$ 1729, 1649 and 1620 cm.$^{-1}$ The initial material employed in Example 8 was prepared as follows:

16α,17α-diacetoxy - 6 - methylpragna - 4,6 - diene-3,20-dione (Ellis, Hall, Petrow and Williamson, J. Chem. Soc., 1962, 22) (2 g.) in dry benzene (30 ml.) was treated with methyl orthoformate (1.5 ml.), methanol (1.5 ml.) and tolune-p-sulphonic acid (50 mg.), and the mixture refluxed for 3 hours. After addition of pyridine, (1 ml.), the cooled mixture was washed, dried, and the solvent removed in vacuo. The residue was purified from methanol containing a trace of pyridine to give 16α,17α-diacetoxy-3-methoxy-6-methylpregna-3,5,7-trien-20-one, $\lambda_{max.}$ 323 m$\mu$ ($\epsilon$, 19,450), $\gamma_{max.}^{CCl_4}$ 1737, 1720, 1648 and 1616 cm.$^{-1}$ Following is a description by way of example of methods of carrying the invention into effect.

EXAMPLE 1

*17α-acetoxy-6-methylpregna-4,7-diene-3,20-dione*

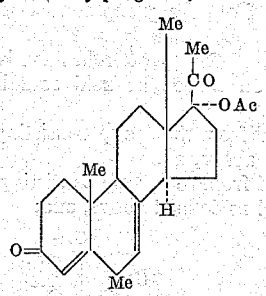

A solution of 17α-acetoxy-3-ethoxy-6-methylpregna-3,5,7-trien-20-one-(2 g.) in acetic acid (75 ml.) and water (1 ml.) was heated for 10 minutes on the steam-bath. Thereafter, water was added portionwise during 20 minutes, with continued heating of the mixture, until crystallisation of the product occurred. When cool, the crystals were collected by filtration, washed and dried. A solution in benzene was filtered through a small column of alumina, to give material which crystallised from acetone. 17α - acetoxy-6-methylpregna-4,7-diene-3,20-dione separated in prisms, M.P. 240 to 243° C. $[\alpha]_D^{21}$ —6° (c., 0.38 in chloroform), $\lambda_{max.}$ 237–238m$\mu$ ($\epsilon$, 15,420), $\gamma_{max.}^{CCl_4}$ 2967, 1742, 1719, 1674, 1618 and 1367 cm.$^{-1}$

EXAMPLE 2

*Preparation of 6-methylandrosta-4,7-diene-3,17-dione*

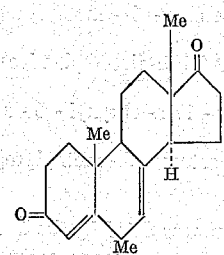

A solution of 3,17,17-trimethoxy-6-methylandrosta-3,5,7-triene (1.6 g.) in acetic acid (70 ml.) and water (3 ml.) was heated for 10 minutes on the steam bath. Thereafter, water (200 ml.) was added gradually during 20 minutes, with continued heating of the mixture, until the product separated in an oily condition. More water was added to the cooled mixture, the product isolated with ether, and its benzene solution filtered through a short column of alumina. Removal of the solvent gave a residue which was purified from methanol. 6-methylandrosta-4,7-diene-3,17-dione separated in prismatic needles, M.P. 157 to 160° C., $[\alpha]_D^{22}$+98° C., 0.68 in chloroform), $\lambda_{max.}$ 237.5 m$\mu$ ($\epsilon$ 14,800), $\gamma_{max.}^{CCl_4}$ 2964, 1745, 1681, 1620, 1453 and 1373 cm.$^{-1}$

EXAMPLE 3

*17α-acetoxy-6,16α-dimethylpregna-4,7--diene-3,20-dione*

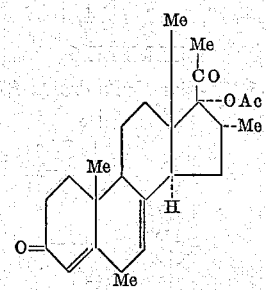

17α-acetoxy-6,16α-dimethyl-3-ethoxypregna-3,5,7-trien-20-one (3.0 g.) in warm acetic acid (100 ml.) was treated with water (1.5 ml.) and the mixture heated for 10 minutes on the steam-bath. Thereafter, water (200 ml.) was added gradually during 20 minutes with continued heating of the mixture. After being thoroughly cooled, the product was filtered off and washed neutral. It was then chromatographed on alumina, employing benzene as eluant to give material which was fractionally crystallised from acetone. 17α - acetoxy-6,16α-dimethylpregna-4,7-diene-3,20-dione separated as cubes, M.P. 172 to 175° C.

EXAMPLE 4

*17α-acetoxy-21-fluoro-6-methylpregna-4,7-diene-3,20-dione*

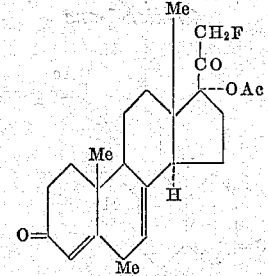

A solution of 17α-acetoxy-3-ethoxy-21-fluoro-6-methylpregna-3,5,7-trien-20-one (1.5 g.) in acetic acid (60 ml.) and water (2 ml.) was heated for 10 minutes on the steam bath. Thereafter, water (150 ml.) was added gradually during 20 minutes, with continued heating of the mixture, until the product separated. It was isolated with ether, and its benzene solution filtered through a short column of alumina. Removal of the solvent gave a residue which was purified from methanol. 17α-acetoxy-21-fluoro-6-methylpregna-4,7-diene-3,20-dione separated in needles, $\lambda_{max.}$ 238 m$\mu$ ($\epsilon$, 15,300), $\gamma_{max.}^{CCl_4}$ 1743, 1720, 1671, 1618 cm.$^{-1}$

EXAMPLE 5

*17α,21-diacetoxy-6-methylpregna-4,7-diene-3,20-dione*

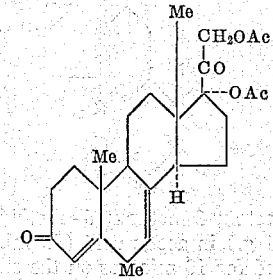

17α21-diacetoxy-3-methoxy-6-methylpregna-3,5,7-trien-20-one (2 g.) in acetic acid 70 ml.) and water (2 ml.) was heated for 10 minutes on the steam bath. Thereafter, water was added portionwise during 15 minutes until precipitation of the product was complete. It was collected, washed and repeatedly crystallised from aqueous ethanol to give 17α,21-diacetoxy-6-methylpregna-4,7-diene-3,20-dione, needles, $\lambda_{max}$ 239 m$\mu$ ($\epsilon$, 15,850), $\gamma^{CCl_4}_{max.}$ 1742, 1720, 1674, 1619 cm.$^{-1}$

EXAMPLE 6

*17β-acetoxy-6,17-dimethylandrosta-4,7-dien-3-one*

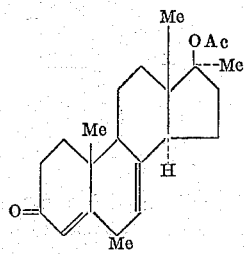

A solution of 17β-acetoxy-6,17α-dimethyl-3-methoxyandrosta-3,5,7-triene (300 mg.) in methanol (15 ml.) at 40° C. was treated with one drop of concentrated hydrochloric acid. Two minutes later, the mixture was poured into water and the product isolated with ether and purified by crystallisation. 17β-acetoxy-6,17α-dimethylandrosta-4,7-dien-3-one formed. Crystals, $\lambda_{max}$ 238 m$\mu$ ($\epsilon$, 15,200), $\gamma^{CCl_4}_{max.}$ 1738, 1672, 1618 cm.$^{-1}$

EXAMPLE 7

*17β-acetoxy-17α-ethynyl-6-methylandrosta-4,7-dien-3-one*

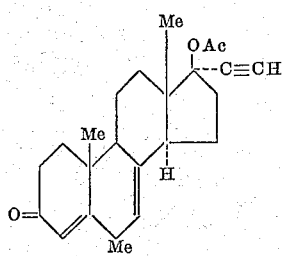

A solution of 17β-acetoxy-3-ethoxy-17α-ethynyl-6-methylandrosta-3,5,7-triene (0.5 g.) in methanol (25 ml.) at 35° C. was treated with one drop of concentrated hydrochloric acid, and the mixture was poured into water. The product was isolated with ether, and crystallised to give 17β-acetoxy-17α-ethynyl-6-methylandrosta-4,7-dien-3-one, $\lambda_{max}$ 238.5 m$\mu$ ($\epsilon$, 15,650), $\gamma^{CCl_4}_{max.}$ 2240, 1738, 1670, 1619 cm.$^{-1}$

EXAMPLE 8

*16α,17α-diacetoxy-6-methylpregna-4,7-diene-3,20-dione*

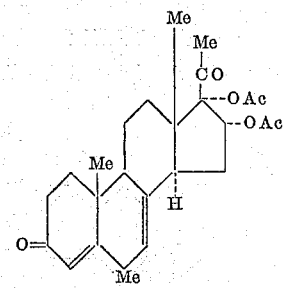

16α,17α-diacetoxy-3-methoxy-6-methylpregna-3,5,7-trien-20-one (1 g.) in acetic acid (35 ml.) and water (1 ml.) was heated for 10 minutes on the steam bath. The mixture was poured into water and the product isolated with ether and crystallised from aqueous ethanol. 16α,17α-diacetoxy-6-methylpregna-4,7-diene-3,20-dione formed needles, $\lambda_{max}$ 238.5 m$\mu$ ($\epsilon$, 14,950), $\gamma^{CCl_4}_{max.}$ 1740, 1719, 1672, 1620 cm.$^{-1}$

We claim:
1. A 6-methyl-3-oxo-4,7-dienic steroid selected from the group consisting of

(a)

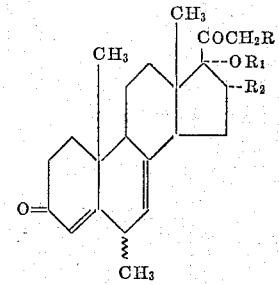

wherein
R is selected from the group consisting of H, halogen, carbon carboxylic acid containing from 1 to 12 atoms, hydroxyl and OAcyl wherein Acyl is derived from a hydrocarbon carboxylic acid containing from 1 to 12 atoms,
$R_1$ is selected from the group consisting of H and Acyl as defined above, and
$R_2$ is selected from the group consisting of H, CH$_3$, OH and OAcyl as defined above, and;

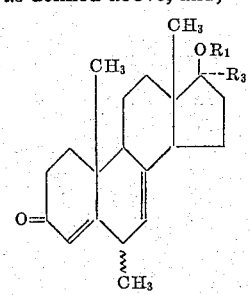

wherein $R_1$ has the definition given above, and $R_3$ is selected from the group consisting of hydrogen, lower alkyl and lower alkynyl.

2. 17α-acetoxy-6-methylpregna-4,7-diene-3,20-dione.
3. 17α-acetoxy-6,16α-dimethylpregna-4,7-diene-3,20-dione.
4. 17α-acetoxy-21-fluoro-6-methylpregna-4,7-diene-3,20-dione.
5. 17α,21-diacetoxy-6-methylpregna-4,7-diene-3,20-dione.
6. 17β-acetoxy-6,17α-dimethylandrosta-4,7-dien-3-one.
7. 17β-acetoxy-17α-ethynyl-6-methylandrosta-4,7-dien-3-one.
8. 16α,17α-diacetoxy-6-methylpregna-4,7-diene-3,20-dione.

References Cited by the Examiner

UNITED STATES PATENTS 2,926,163   2/60   Dauben et al. _____ 260—239.55

FOREIGN PATENTS 708,027   4/54   Great Britain.

OTHER REFERENCES

Ercoli et al.: J.A.C.S. 75, pp. 650–653 (1953).
Fieser et al.: Natural Products Related to Phenanthrene, 3 rd ed., 1949, pp. 371–372, Reinhold Pub. Co., N.Y.

LEWIS GOTTS, *Primary Examiner.*